United States Patent [19]
Barbour

[11] Patent Number: 5,839,594
[45] Date of Patent: Nov. 24, 1998

[54] THRUWAY ELECTRICAL OUTLET BOX SYSTEM

[76] Inventor: Bruce Barbour, 2106 First Ave., Elizabethtown, N.C. 28337

[21] Appl. No.: 50,172

[22] Filed: Mar. 30, 1998

[51] Int. Cl.[6] ...................................................... H02G 3/00
[52] U.S. Cl. .............................................. 220/3.7; 220/3.5
[58] Field of Search ........................... 220/3.5, 3.7, 3.94; 174/53, 57

[56] References Cited

U.S. PATENT DOCUMENTS

| | | | |
|---|---|---|---|
| 1,875,101 | 8/1932 | Morrell . | |
| 1,961,728 | 6/1934 | Arnest et al. | 220/3.7 X |
| 2,130,839 | 9/1938 | Conners | 247/19 |
| 2,782,954 | 2/1957 | Antonucci | 220/3.92 |
| 2,875,915 | 3/1959 | Buckels | 220/3.7 |
| 2,989,206 | 6/1961 | McAfee | 220/3.7 |
| 3,622,029 | 11/1971 | Ware | 220/3.7 |
| 3,651,245 | 3/1972 | Moll | 220/3.7 X |
| 4,634,015 | 1/1987 | Taylor | 220/3.7 |
| 4,673,097 | 6/1987 | Schuldt | 220/3.5 |

Primary Examiner—Steven M. Pollard
Attorney, Agent, or Firm—Mills Law Firm PLLC; Clifford F. Rey

[57] ABSTRACT

A thruway electrical outlet box system of the type that will extend entirely through an internal wall of a building and present on the opposite surfaces of that wall an opening for an outlet plug or switch mounting is disclosed. The outlet boxes of the present system are fabricated from electrically nonconductive, engineering grade plastic materials having mechanical and physical properties suitable for electrical applications. Each electrical outlet box includes an internal, central partition that separates back-to-back compartments which open onto the opposed wall surfaces. The present system includes outlet boxes of various configurations ranging from a pair of single outlet boxes to a pair of quadruple outlet boxes and combinations thereof. The overall length of the electrical outlet boxes is made adjustable by the inclusion of break-away extension members integrally formed about peripheral edges of the opposed compartment openings to accommodate various thicknesses of plaster and wallboard construction. The electrical outlet boxes of the present system permit a pair of multiple outlets in different rooms to be installed for the approximate cost of labor and material of a single outlet.

8 Claims, 3 Drawing Sheets

THRUWAY ELECTRICAL OUTLET BOX SYSTEM

BACKGROUND OF INVENTION

1. Field of Invention

This invention relates generally to electrical outlet boxes and, more particularly, to a thruway electrical outlet box system that extends entirely through an internal wall of a building and presents on both surfaces of the wall.

Efforts are continuously being made to simplify electrical systems and components which represent a substantial percentage of the labor and material in new construction. To this end so-called thruway electrical boxes were developed to provide a pair of outlets in different rooms which may be installed for the approximate cost and labor and material of a single outlet. For example, an outlet box of this type is disclosed in U.S. Pat. No. 2,875,915 which extends entirely through an internal wall of a building and presents on both faces of that wall an opening for installing an outlet or a switch.

However, such a thruway box requires numerous components and fittings which must be adjusted during the installation process. Further, the above described thruway box does not provide for multiple outlets and switches or different combinations thereof in the manner of the present invention.

2. Description of Related Prior Art Under 37 CFR § 1.98

U.S. Pat. No. 2,875,915 to Christopher C. Buckels discloses a thruway outlet box of the type that is open at both ends and is of a dimension that it will extend entirely through an internal wall of a building a present on both faces of that wall an opening for an outlet or switch mounting. This disclosure does not provide for multiple outlets or switches or the interconnection of junction boxes of different size and capacity in manner of the present invention.

U.S. Pat. No. 2,130,839 to Michael J. Conners discloses an electrical outlet box which may be positioned within a wall and open on opposite sides of that wall for the installation of switches and outlets. However, this device is fabricated from conventional metallic material and requires numerous components and fasteners for its installation.

U.S. Pat. No. 1,875,101 to James A. Morrell discloses an electrical outlet box which may be installed so that the outlets may be arranged in both the rooms on opposite sides of a partition wall by installation of the same outlet box. This outlet box is adjustable to fit varying wall thicknesses by telescoping sections which are slideably engaged one inside another. However, this outlet box requires numerous component parts and fasteners for proper installation.

U.S. Pat. No. 4,634,015 to Jerald M. Taylor discloses an adjustable electrical outlet box which may be attached to a conventional electrical junction box to position the front of the outlet box at selectable distances from the junction box. However, this outlet box also requires numerous component parts and fasteners and is fabricated from conventional metallic materials.

U.S. Pat. No. 3,622,029 to Gordon K. Ware discloses an electrical outlet box including a first portion for receiving electrical outlets, switches, and cover plates of standard size and a second portion telescopically associated with the first portion for increasing the interior volume of the outlet box for accommodating electrical wiring.

Finally, U.S. Pat. No. 2,782,954 to James A. Antonucci discloses a combination switch and outlet box arranged to be usable by alternate positioning of an end portion as either a switch box or an outlet box. However, this outlet box also includes numerous components and fasteners, is made from conventional metallic materials, and does not serve a thruway function in manner of the present invention.

SUMMARY OF THE INVENTION

After much research and study of the above described problems, the present invention has been developed to provide an improved electrical outlet box system having a so-called thruway design which will extend entirely through an internal wall of the building and present on both faces of that wall an opening for an outlet or switch mounting in various configurations on either side of that wall. The practical result of this type of outlet box system is that any number of switches and outlets may be installed for the approximate cost in labor and materials of a single outlet in the prior art designs.

In addition, the present system provides electrical outlet boxes of a unitary construction being fabricated from an electrically nonconductive material in virtually any multiple switch/outlet configuration to be encountered in residential or commercial construction.

The unitary, molded plastic construction of the outlet boxes of the present system simplifies the associated manufacturing processes for such boxes thereby reducing the number of component parts and manufacturing costs in comparison to similar prior art systems.

In view of the above, it is an object of the present invention to provide an electrical outlet box system wherein a plurality of so-called thruway outlet boxes are provided in multiple configurations which will extend entirely though an internal wall of a building and present on opposite faces of that wall an opening for an outlet or switch mounting.

Another object of the present invention is to provide an electrical outlet box system wherein a pair of electrical outlet boxes in adjacent rooms may be provided for the approximate cost of labor and material of a single outlet of a prior art design.

Another object of the present invention is to provide a thruway outlet box system wherein the outlet boxes are fabricated from an electrically nonconductive material which provides an enhanced measure of safety for the homeowner and technicians installing the present system.

Another object of the present invention is to provide a simplified electrical outlet box having fewer components and reduced manufacturing costs.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
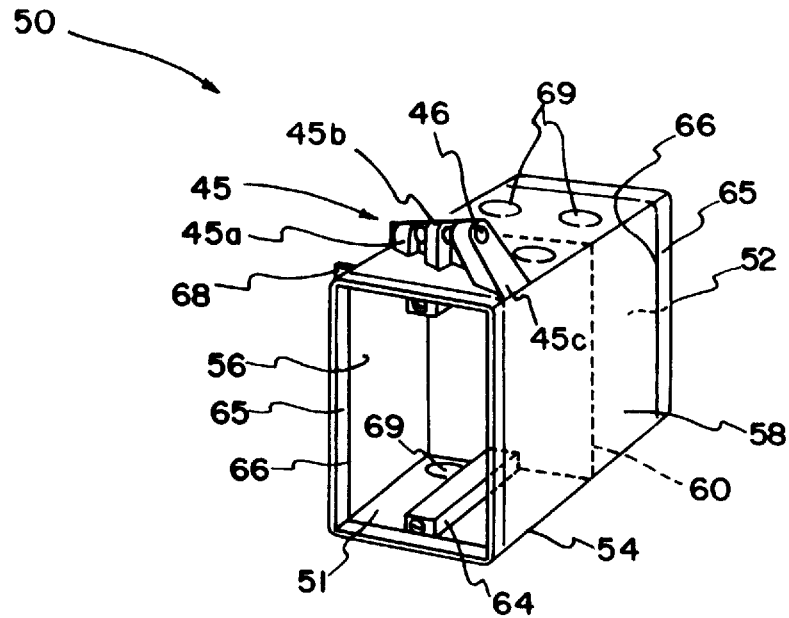
FIG. 1 is a perspective view of one embodiment of a thruway electrical outlet box of the present system.

With further reference to the drawings, there is shown therein in the electrical outlet box in accordance with the system of the present invention, indicated generally at 10 and illustrated in FIG. 1.

The outlet box 10 is of a type known in the electrical trade as a thruway box with significant differences from those found in the prior art.

Figure 2:
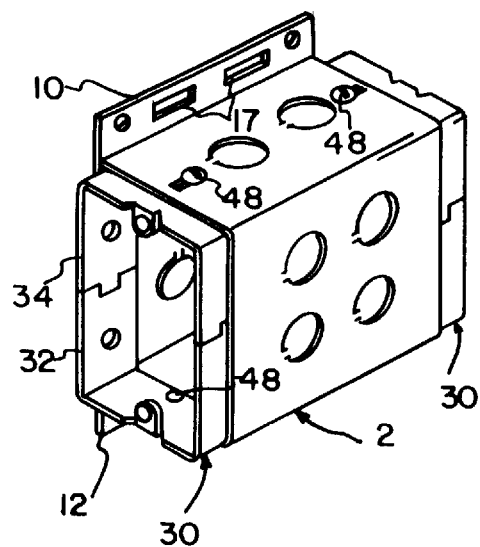
FIG. 2 is a perspective view of a thruway outlet box of the Prior Art and labeled PRIOR ART.

For purposes of comparison it may be beneficial to briefly review the structure and function of such a prior art thruway outlet box. With reference to FIG. 2 there is shown therein a multiple position outlet box as disclosed in U.S. Pat. No. 2,875,915 and labeled Prior Art. This device comprises a tubular, rectangular central section, indicated generally at 2 being open at either end. A pair of generally tubular, rectangular members 30 comprised of U-shaped elements 32 and 34 are adapted for sliding engagement within the open ends of the central section 2 such that the outlet box is open at both ends and is of such dimension that it will extend entirely through an internal wall of a building and present on both faces of that wall an opening for an outlet or switch mounting.

The overall length of the prior art outlet box is telescopically adjustable by sliding engagement of the members 30 within the central section 2 and may be locked in position by the use of screws 48 as shown in the drawing.

The central section 2 is provided with flanges 10 and 12 having apertures or slots 14 formed therein for attachment of the outlet box to an internal wall stud.

Thus, in the assembled configuration a passageway extending entirely through the prior art box 2 is defined.

It will be noted that all of the components and fasteners of the prior art are fabricated from electroconductive materials such as steel.

Referring again to the present invention and to FIG. 1, the outlet box 10 of the present invention will now be described in detail. The present outlet box 50 is a unitary construction fabricated from an engineering grade plastic material which is electrically nonconductive and which has exceptional characteristics for heat and fire resistance.

The outlet box 50 is a box-shaped construction defined by a top surface 53, a bottom surface 54 and a pair of parallel side walls 56 and 58 extending therebetween and integrally connected thereto. The outlet box 50 is divided by a central partition 60 being integrally formed along the interior midline thereof effectively dividing the box 50 into two separate back-to-back compartments 51 and 52 each of which presents a pair of vertically opposed mounting lugs 62 and 64 for an outlet or switch mounting.

Each end of the outlet box 50 includes an extension section 65 formed about the peripheral edge thereof as shown in FIG. 1. The extension section 65 is defined by score lines 66 which extend about the interior and the exterior periphery of the outlet box 50 at both ends to effectively weaken the strength of the walls along the lines 66. This permits the extension members 65 to be broken away by bending the same along the score lines 66 in a known manner providing an overall length adjustment of the box 50 during the installation as described hereinafter in further detail.

Figure 3:
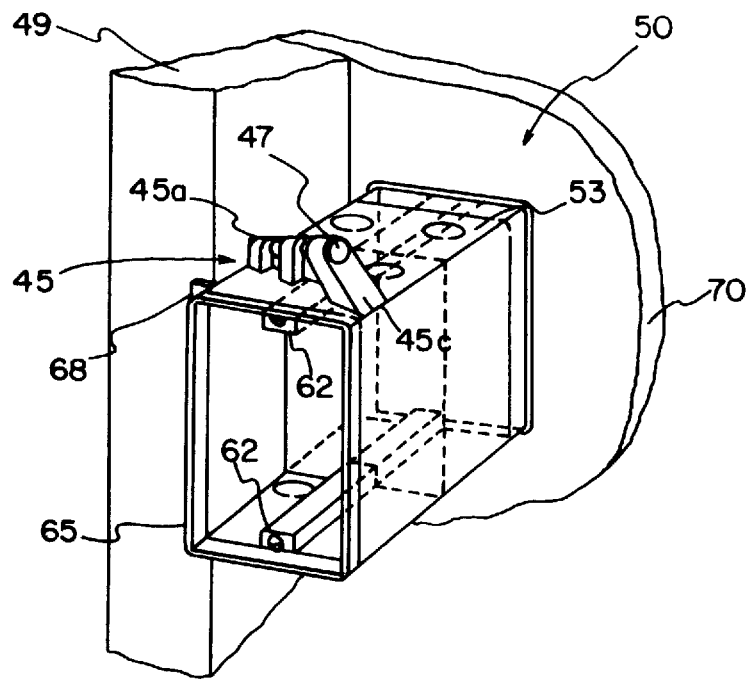
FIG. 3 is a perspective view of the outlet box depicted in FIG. 1 shown in its functional position mounted on an internal wall member.

Integrally formed on the top surface 53 of the outlet box 50 is a mounting bracket, indicated generally at 45, including a nail hole 46 designed to accept a common nail 47 or other suitable fastener therein for installation of the outlet box 50 in a wall stud member 49 as shown in FIG. 3.

In the preferred embodiment the bracket 45 includes a plurality of upwardly projecting support tabs 45a, 45b, and 45c being integrally molded with the top surface 53 which functions to provide strength and reinforcement to the bracket 45. Of course, the nail hole 46 extends through all such tabs 45a, 45b, and 45c as shown in FIG. 3. In addition, the axis of the nail hole 46 is disposed at an acute angle relative to the top surface 53 of the box 50 so as to provide more convenient access for nailing the box 50 to the stud member 49.

To ease installation and to insure proper location of the box 50 on the stud member 49, a right-angled flange member 68 is integrally formed and extends transversely across the length of the side wall 56 as shown in FIG. 3. The flange member 68 is disposed at a predetermined dimension from the edge of the extension section 65 and abuts the end face 49a of the stud member 49 to position the open end of the box 50 flush with the wall surface during the installation process.

It will be appreciated by those skilled in the art that the linear distance from the flange 68 to either end of the box 50 is made adjustable by the removal of the extension sections 65 depending upon the thickness of the plaster or wallboard 70 in a particular installation.

It can be seen that the outlet box 50 includes a plurality of circular knockout plugs 69 for the attachment of electrical conduit (not shown) in a known manner.

Figure 4:
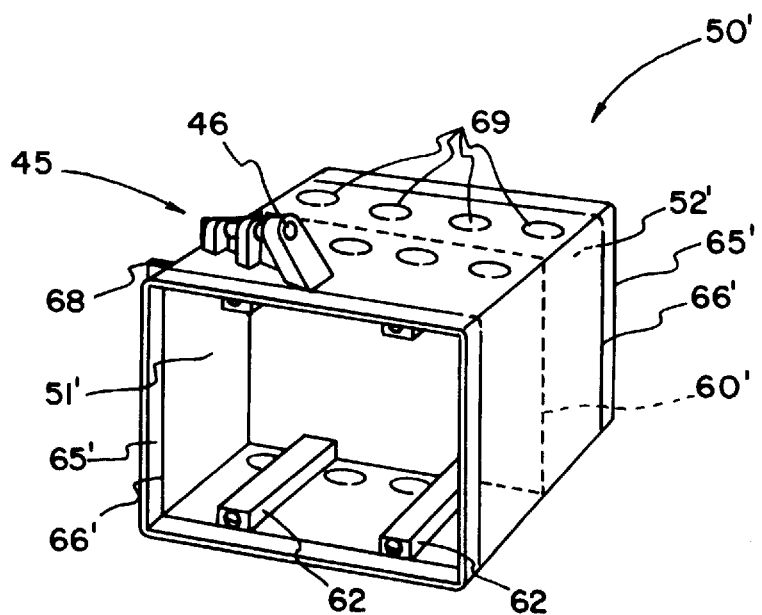
FIG. 4 is a perspective view of an alternative embodiment of an electric outlet box in accordance with the present system.

Referring now to FIG. 4 there is shown therein an alternative embodiment of the electrical outlet box of the present invention, indicated generally at 50'. The embodiment of FIG. 4 is utilized when it is desired to install multiple electrical switches or outlet plugs (not shown) in the same outlet box 50'. In this embodiment the outlet box 50' is also of a unitary construction fabricated from an engineering plastic material having suitable physical and mechanical properties for electrical systems. The box-shaped construction also includes a partition 60' which divides the box 50' into a pair of compartments 51' and 52' in back-to-back relation so as to present openings on both surfaces of an internal wall for mounting outlet plugs or switches (not shown) on mounting lugs 62.

This embodiment also includes the same mounting bracket 45 and right-angle flange 68 for locating and installing the box 50' on a wall stud member 49.

It can be seen that this version of the outlet box 50' also includes a plurality of circular knockout plugs 69 to permit the attachment of electrical conduit (not shown) carrying electrical wiring (not shown).

This embodiment is also provided with extension sections 65' integrally formed at the open ends of the box 50' being defined by score lines 66' to facilitate removal of the extension sections as required for a particular application.

Figure 5:
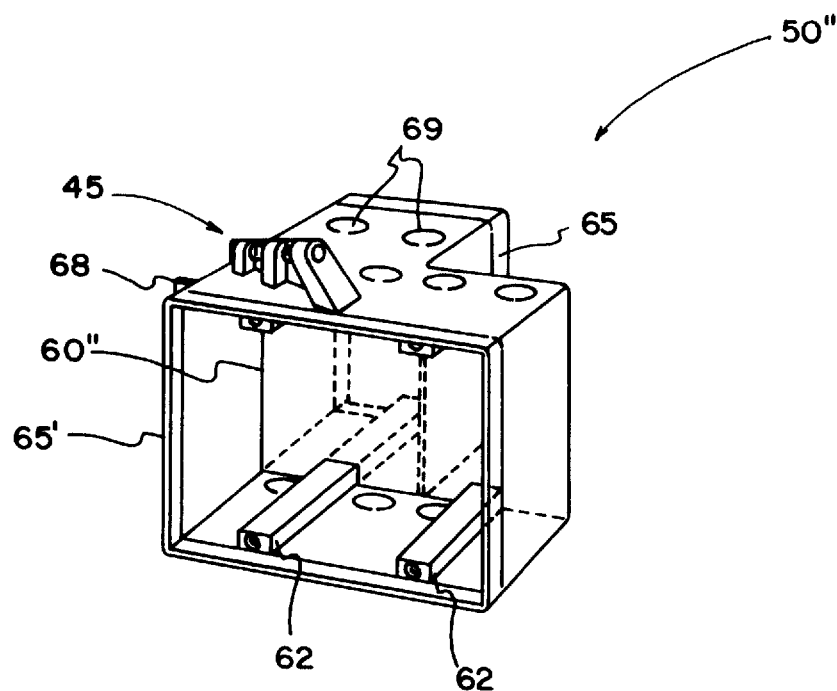
FIG. 5 is a perspective view of yet another alternative embodiment of an electrical outlet box in accordance with the present system.

Referring now to FIG. 5 there is shown therein an electrical outlet box in accordance with the present system, indicated generally at 50". This embodiment of the outlet box is utilized when it is desired to install multiple electrical switches or plugs on one wall surface and only a single outlet or switch on the opposite wall surface.

In this embodiment the outlet box 50" is also of a unitary construction being fabricated from an engineering plastic material having suitable mechanical and physical properties for electrical systems.

As in the previous embodiments a partition wall 60" divides the box 50" into separate compartments 51" and 52" arranged in back-to-back relation to present openings on both faces of an internal wall for outlets or switch mountings.

In all other aspects it will be understood that the outlet box 50" is constructed and installed in the manner described hereinabove for the previous embodiments.

Although only three alternative embodiments have been illustrated herein to relieve prolixity in the present disclosure, it will be appreciated by those skilled in the art that numerous additional embodiments of the electrical outlet box 50 are contemplated by the present invention having the capacity for triple and quadruple outlet plugs and switch mountings and combinations thereof.

Such additional embodiments are also fabricated from electrically nonconductive engineering plastic materials as unitary constructions having all of the features and characteristics of those embodiments described hereinabove in detail.

From the above it can be seen that the electrical outlet box system of the present invention provides a versatile and efficient apparatus and method for the installation of what is known in the electrical trade as a thruway outlet box. The practical result of this type of box is that multiple outlets or switch mountings are provided in different rooms and may be installed for the approximate cost of labor and material of a single outlet.

The electrical outlet boxes of the present system are fabricated from an electrically nonconductive material as a molded, unitary construction providing an enhanced level of safety to both the homeowner and the installing technician.

The electrical outlet boxes of the present system are adjustable to different thicknesses of plaster and wallboard by the use of breakaway extension members formed on open ends of the box.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An electrical outlet box system comprising:
   a plurality of generally box-shaped structures of unitary construction, said box-shaped structures having openings at both ends thereof and being dimensioned to extend entirely through an internal wall of a building and to present on opposite faces of said wall said opening for the installation of electrical outlets and switches, said box-shaped structures including internal partitioning means so as to divide said structures into a pair of compartments arranged in back-to-back relation such that said openings are oppositely directed; and length adjusting means including at least one extension member being integrally formed about the peripheral edge of said openings, said extension members being defined by peripherally extending score lines such that said extension members may be broken away from said structures to adjust the overall length thereof.

2. The outlet box system of claim 1 wherein said box-shaped structures are fabricated from engineering grade plastic materials having physical and mechanical properties suitable for electrical systems.

3. The outlet box system of claim 2 wherein said box-shaped structures are configured to accommodate a plurality of outlet plugs and switches within each of said compartments.

4. The outlet box system of claim 2 wherein said box-shaped structures are configured to accommodate a different number of said outlets and switches within each of said compartments.

5. The outlet box system of claim 2 wherein said partitioning means includes an interior partition wall integrally formed with said box-shaped structure, said partition wall being disposed in a plane dividing said structures into said compartments and forming a common wall therebetween.

6. The electrical outlet box system of claim 2 wherein said box-shaped structures include a locating flange integrally formed along a side wall thereof in parallel relation to said extension members, said flange functioning to position said box-shaped structures on an internal wall stud member.

7. The outlet box system of claim 2 wherein said box-shaped structures include an integrally formed mounting bracket disposed on a top surface thereof, said bracket including a mounting hole having a longitudinal axis, said axis describing an acute angle relative to said top surface to permit convenient access thereto by an installation tool.

8. The outlet box system of claim 2 wherein said box-shaped structures include a plurality of generally circular knockout sections to permit the attachment of electrical conduit to said structures.

* * * * *